(12) United States Patent
Fukuda

(10) Patent No.: US 12,062,490 B2
(45) Date of Patent: Aug. 13, 2024

(54) MULTILAYER CERAMIC CAPACITOR

(71) Applicant: Murata Manufacturing Co., Ltd., Nagaokakyo (JP)

(72) Inventor: Yoshihiro Fukuda, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 267 days.

(21) Appl. No.: 17/580,848

(22) Filed: Jan. 21, 2022

(65) Prior Publication Data

US 2022/0262566 A1   Aug. 18, 2022

(30) Foreign Application Priority Data

Feb. 15, 2021   (JP) ................................. 2021-021409

(51) Int. Cl.
| | |
|---|---|
| *H01G 2/14* | (2006.01) |
| *H01G 4/008* | (2006.01) |
| *H01G 4/232* | (2006.01) |
| *H01G 4/248* | (2006.01) |
| *H01G 4/30* | (2006.01) |
| *H01G 4/12* | (2006.01) |

(52) U.S. Cl.
CPC ............... *H01G 2/14* (2013.01); *H01G 4/232* (2013.01); *H01G 4/248* (2013.01); *H01G 4/30* (2013.01); *H01G 4/008* (2013.01); *H01G 4/1209* (2013.01)

(58) Field of Classification Search
CPC .......... H01G 2/14; H01G 4/232; H01G 4/248; H01G 4/30; H01G 4/008; H01G 4/1209
USPC ...................................................... 361/224
See application file for complete search history.

(56) References Cited

U.S. PATENT DOCUMENTS

| | | | | |
|---|---|---|---|---|
| 3,612,963 | A  * | 10/1971 | Piper ........................ | H01G 4/30 |
| | | | | 361/309 |
| 9,336,948 | B2 * | 5/2016 | Awata ..................... | H01G 4/224 |
| 9,984,824 | B2 * | 5/2018 | Tanaka .................... | H01G 4/232 |
| 10,497,516 | B2 * | 12/2019 | Ito ........................... | H01G 4/30 |

(Continued)

FOREIGN PATENT DOCUMENTS

| | | |
|---|---|---|
| JP | 08-306580 A | 11/1996 |
| JP | 2011-151252 A | 8/2011 |

(Continued)

OTHER PUBLICATIONS

Material and Process Selection Charts CES EDUPACK (Year: 2010).*

*Primary Examiner* — Timothy J Thompson
*Assistant Examiner* — Michael F McAllister
(74) *Attorney, Agent, or Firm* — Keating & Bennett, LLP

(57) ABSTRACT

A multilayer ceramic capacitor includes a multilayer body including dielectric layers and internal electrode layers that are laminated and a pair of external electrodes electrically connected to the internal electrode layers. The multilayer body includes an effective portion, a principal surface-side outer layer between both principal surfaces and outermost surfaces of the effective portions on both principal surface sides, and an end surface-side outer layer between both end surfaces and outermost surfaces of the effective portions on both end surface sides. The principal surface-side outer layer includes a glass layer facing the effective portion. The glass layer overlaps tips of the external electrodes on a portion of both principal surfaces and a portion of both side surfaces, and the glass layer is not exposed from the effective portion at both end surfaces.

18 Claims, 4 Drawing Sheets

(56) References Cited

U.S. PATENT DOCUMENTS

| | | | | |
|---|---|---|---|---|
| 11,657,976 B2* | 5/2023 | Lee | .......... | H01G 4/12 361/301.4 |
| 11,670,456 B2* | 6/2023 | Lee | .......... | H01G 4/005 361/321.2 |
| 2004/0144962 A1* | 7/2004 | Hayakawa | .......... | H01G 4/2325 252/500 |
| 2008/0081200 A1* | 4/2008 | Katsube | .......... | H01G 4/30 427/404 |
| 2009/0190285 A1* | 7/2009 | Kusano | .......... | H01G 4/30 361/321.4 |
| 2010/0097739 A1* | 4/2010 | Prymak | .......... | H01G 4/12 29/25.42 |
| 2012/0147517 A1* | 6/2012 | Hur | .......... | H01G 4/30 29/25.42 |
| 2013/0208399 A1* | 8/2013 | Morita | .......... | H01G 4/30 361/301.4 |
| 2014/0177134 A1* | 6/2014 | Awata | .......... | H01G 4/1236 361/321.5 |
| 2015/0114701 A1* | 4/2015 | Chung | .......... | H01G 2/065 361/321.2 |
| 2015/0348712 A1* | 12/2015 | Lee | .......... | H01G 4/30 156/89.12 |
| 2016/0005543 A1* | 1/2016 | Wada | .......... | H01G 4/1227 361/301.4 |
| 2016/0042867 A1* | 2/2016 | Kisumi | .......... | H01G 4/12 29/25.03 |
| 2016/0093442 A1* | 3/2016 | Nagamoto | .......... | H01G 4/0085 361/301.4 |
| 2017/0018363 A1* | 1/2017 | Tanaka | .......... | H01G 4/232 |
| 2017/0271083 A1* | 9/2017 | Makino | .......... | H01G 4/30 |
| 2018/0042122 A1* | 2/2018 | Wakashima | .......... | H01G 4/30 |
| 2018/0090276 A1* | 3/2018 | Ito | .......... | H01G 4/248 |
| 2018/0240592 A1* | 8/2018 | Morita | .......... | H01G 4/30 |
| 2018/0240598 A1* | 8/2018 | Tanaka | .......... | H01G 4/232 |
| 2019/0096586 A1* | 3/2019 | Tanaka | .......... | H01G 4/005 |
| 2019/0244758 A1* | 8/2019 | Oshima | .......... | H01G 4/1245 |
| 2020/0161048 A1* | 5/2020 | Chun | .......... | H01G 4/012 |
| 2020/0312560 A1* | 10/2020 | Onishi | .......... | H01G 4/232 |

FOREIGN PATENT DOCUMENTS

| | | |
|---|---|---|
| JP | 2014-127504 A | 7/2014 |
| JP | 2017-028013 A | 2/2017 |

* cited by examiner

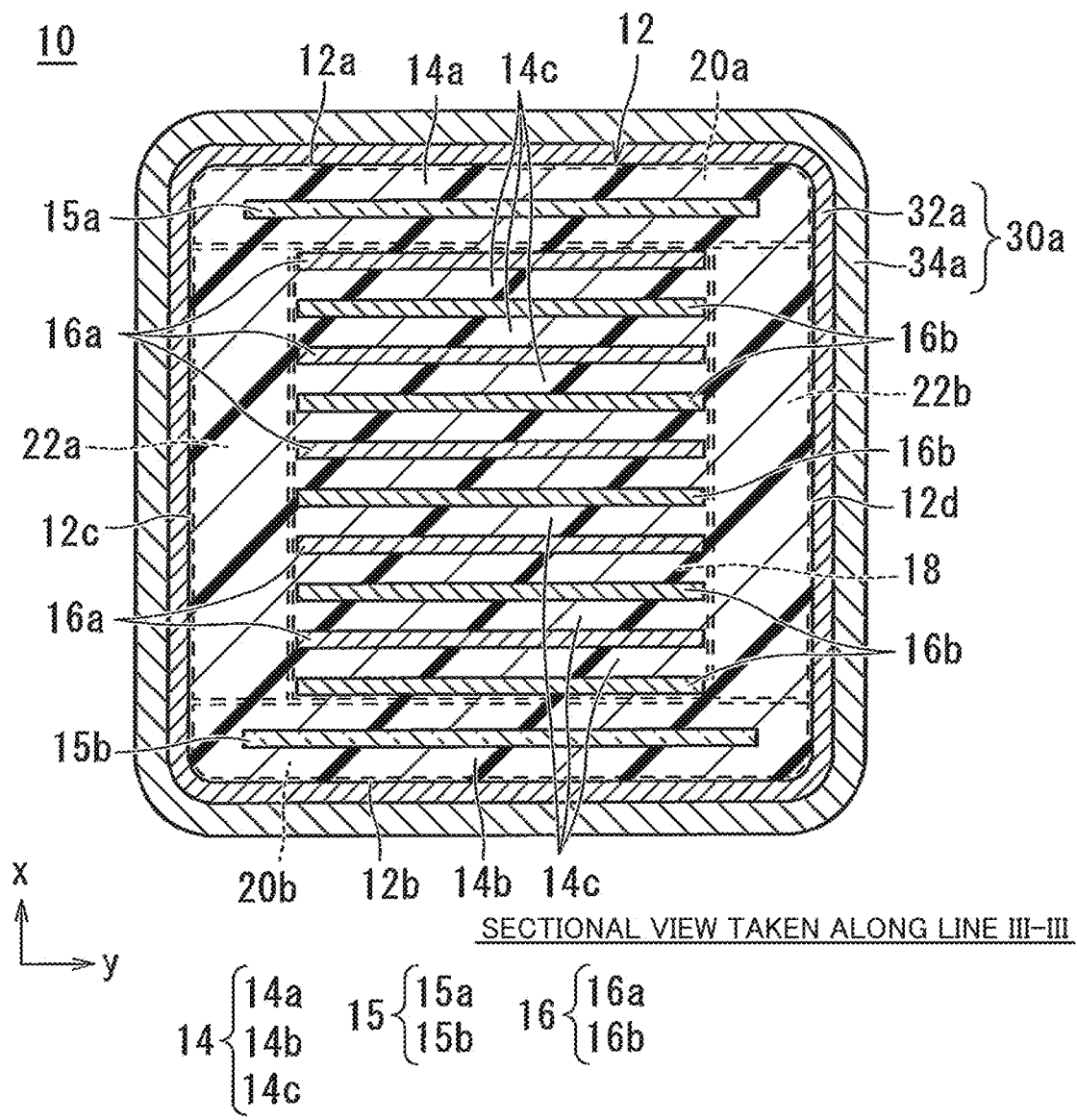

MULTILAYER CERAMIC CAPACITOR

CROSS REFERENCE TO RELATED APPLICATIONS

This application claims the benefit of priority to Japanese Patent Application No. 2021-021409 filed on Feb. 15, 2021. The entire contents of this application are hereby incorporated herein by reference.

BACKGROUND OF THE INVENTION

1. Field of the Invention

The present invention relates to a multilayer ceramic capacitor.

2. Description of the Related Art

In general, a multilayer ceramic capacitor includes a ceramic sintered body made of a dielectric ceramic, such as barium titanate, and an internal electrode is formed inside the ceramic sintered body so as to overlap with each other with a dielectric layer interposed therebetween. An external electrode is formed on one end surface of the ceramic sintered body so as to be electrically connected to the internal electrode, and an external electrode is formed on the other end surface so as to be electrically connected to the internal electrode (for example, see Japanese Patent Laid-Open No. 08-306580A).

However, in the multilayer ceramic capacitor described in Japanese Patent Laid-Open No. 08-306580, when the multilayer ceramic capacitor is directly mounted on a mounting substrate using solder, the mounting substrate and the ceramic sintered body (multilayer body) expand or contract based on respective thermal expansion coefficients when a temperature change is generated. Stress is applied to the ceramic sintered body due to a difference between the thermal expansion coefficients, and sometimes a crack is generated in the ceramic sintered body. In addition, when the crack reaches the internal electrode, sometimes a short-circuit failure is generated.

In addition, for example, when the multilayer ceramic capacitor described in Japanese Patent Laid-Open No. 08-306580 is used in a mobile device such as a mobile phone or a portable music player, sometimes the crack is generated in the ceramic sintered body by an impact (stress) when the mobile device falls, and sometimes the short-circuit failure is similarly generated.

SUMMARY OF THE INVENTION

Preferred embodiments of the present invention provide multilayer ceramic capacitors each of which reduce or prevent a short-circuit failure even if a crack is generated in a multilayer body.

A multilayer ceramic capacitor according to a preferred embodiment of the present invention includes a multilayer body including a plurality of laminated dielectric layers, a plurality of internal electrode layers laminated on the dielectric layers, a first principal surface and a second principal surface facing each other in a height direction, a first side surface and a second side surface facing each other in a width direction orthogonal or substantially orthogonal to the height direction, and a first end surface and a second end surface facing each other in a length direction orthogonal or substantially orthogonal to the height direction and the width direction, a first internal electrode layer on the plurality of dielectric layers and exposed on the first end surface, a second internal electrode layer on the plurality of dielectric layers and exposed on the second end surface, a first external electrode connected to the first internal electrode layer and disposed on the first end surface and a portion of the first principal surface, a portion of the second principal surface, a portion of the first side surface, and a portion of the second side surface, and a second external electrode connected to the second internal electrode layer and disposed on the second end surface and a portion of the first principal surface, a portion of the second principal surface, a portion of the first side surface, and a portion of the second side surface. The multilayer body includes an effective portion in which the plurality of internal electrode layers face each other, a first principal surface-side outer layer on a first principal surface side and including the plurality of dielectric layers between the first principal surface and an outermost surface of the effective portion on the first principal surface side and an extension line of the outermost surface, a second principal surface-side outer layer on a second principal surface side and including the plurality of dielectric layers between the second principal surface and an outermost surface of the effective portion on the second principal surface side and an extension line of the outermost surface, a first end surface-side outer layer on a first end surface side and including the plurality of dielectric layers between the first end surface and an outermost surface of the effective portion on the first end surface side, and a second end surface-side outer layer on a second end surface side and including the plurality of dielectric layers between the second end surface and an outermost surface of the effective portion on the second end surface side, the first principal surface-side outer layer and the second principal surface-side outer layer include a glass layer on a dielectric layer and facing the effective portion, the glass layer overlaps a tip of the first external electrode and a tip of the second external electrode that are on a portion of the first principal surface, a portion of the second principal surface, a portion of the first side surface, and a portion of the second side surface when viewed in the height direction, and the glass layer is not exposed at the first end surface and the second end surface from an effective portion side.

In the multilayer ceramic capacitor described above, the first principal surface- side outer layer and the second principal surface-side outer layer include a glass layer on the dielectric layer and facing the effective portion, the glass layer overlaps the tip of the first external electrode and the tip of the second external electrode that are disposed on the portion of the first principal surface, the portion of the second principal surface, the portion of the first side surface, and the portion of the second side surface when viewed in the height direction, and the glass layer is not exposed from the effective portion side to the first end surface and the second end surface, so that a portion of a crack to the effective portion is able to be prevented. As a result, moisture resistance reliability of the multilayer ceramic capacitor is able to be improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a sectional view taken along a line in FIG. 1.

DETAILED DESCRIPTION OF THE PREFERRED EMBODIMENT

Figure 1:
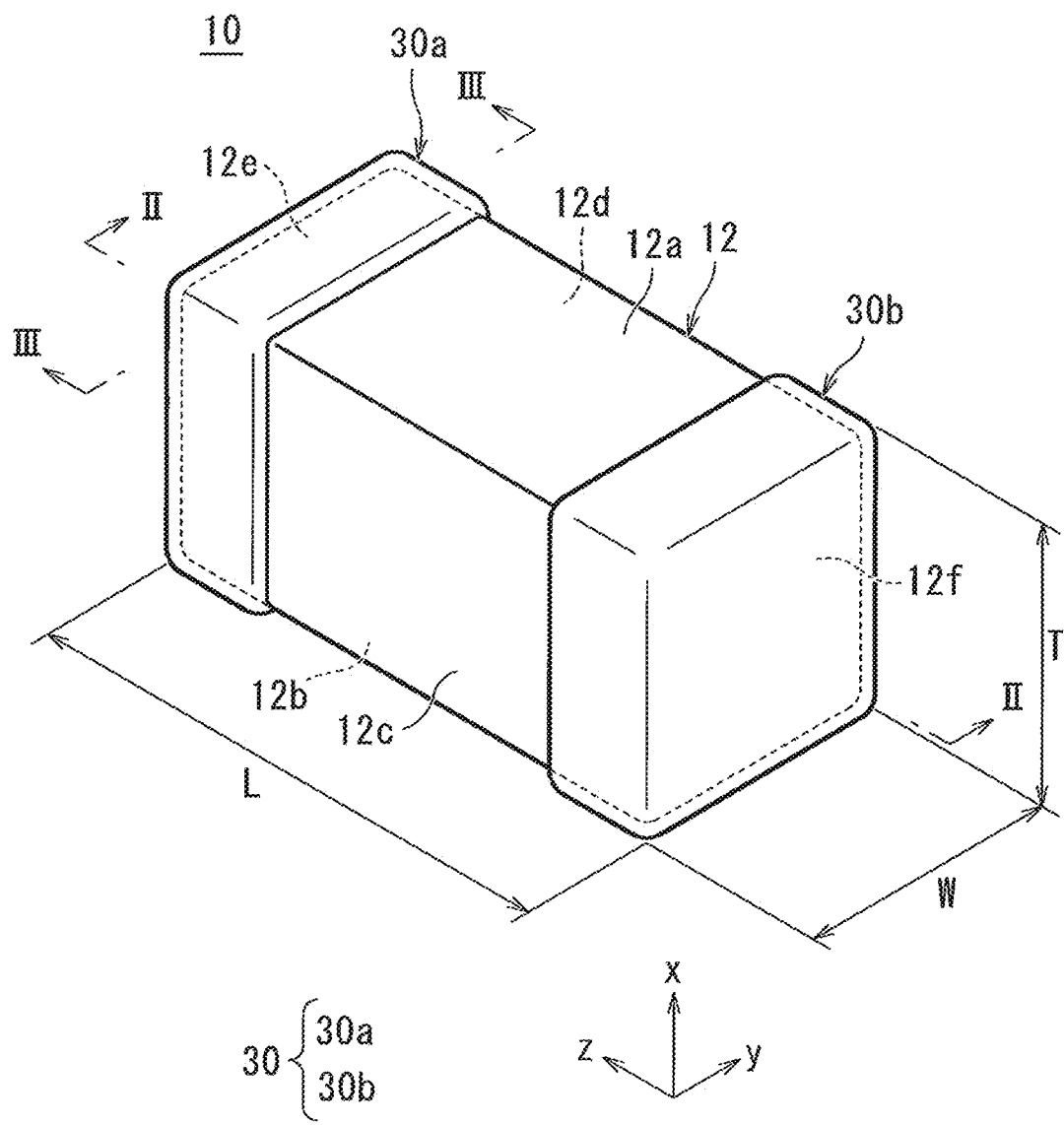
FIG. 1 is an external perspective view illustrating an example of a multilayer ceramic capacitor according to a preferred embodiment of the present invention.

Hereinafter, preferred embodiments of the present invention will be described in detail with reference to the drawings. In the following preferred embodiments, the same or common portions are denoted by the same reference numeral in the drawings, and the description will not be repeated.

1. Multilayer Ceramic Capacitor

Figure 2:
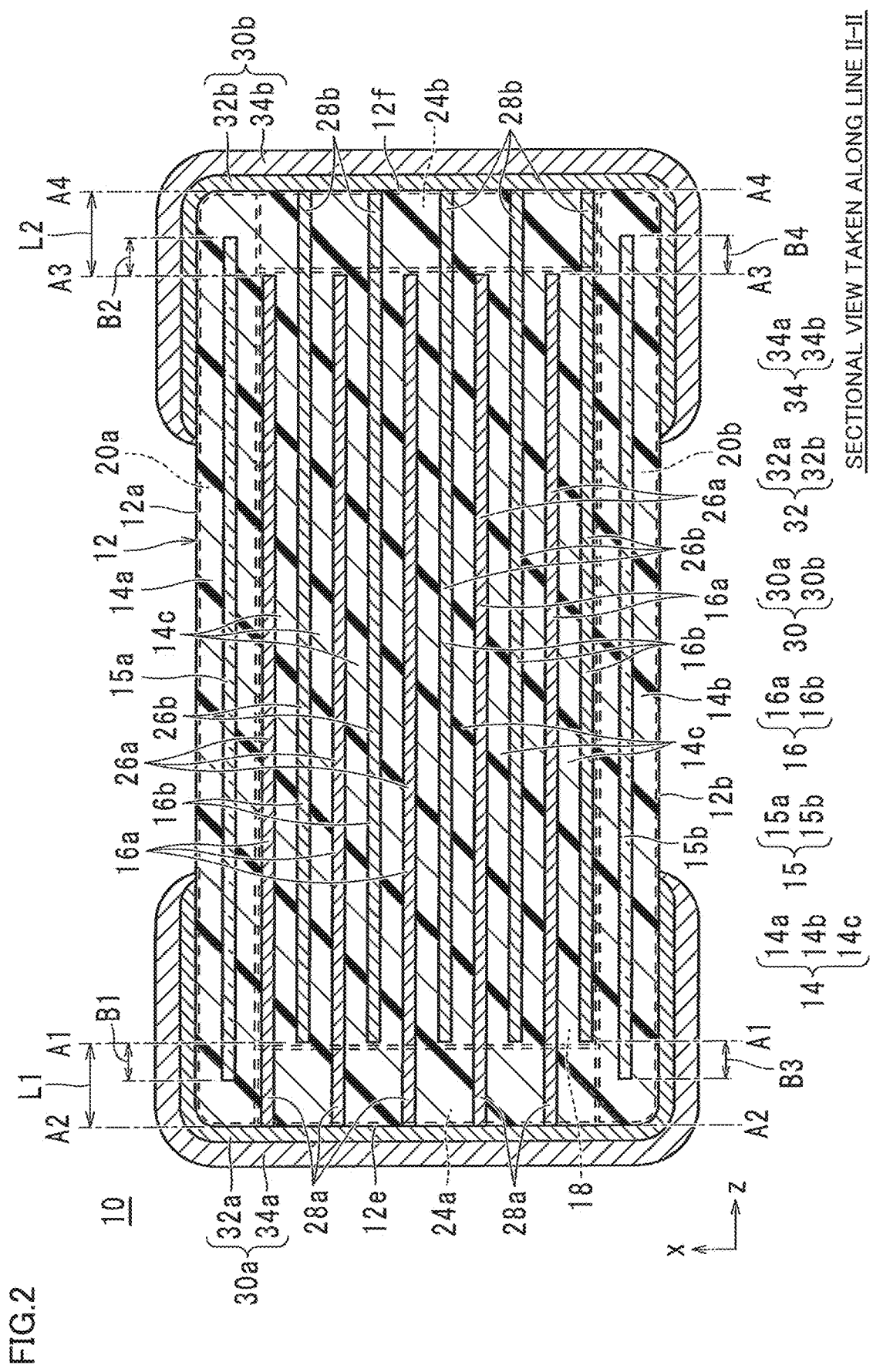
FIG. 2 is a sectional view taken along a line II-II in FIG. 1.
Figure 4A:
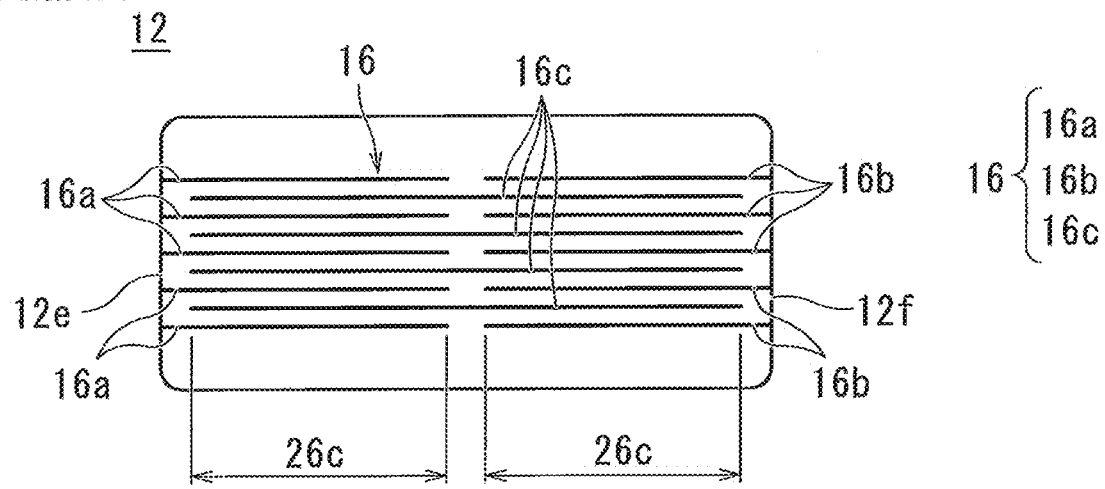
FIG. 4A is a sectional view taken along the line II-II in FIG. 1, and illustrating a structure in which a counter electrode portion of an internal electrode layer of a multilayer ceramic capacitor according to a preferred embodiment of the present invention is divided into two.
Figure 4B:
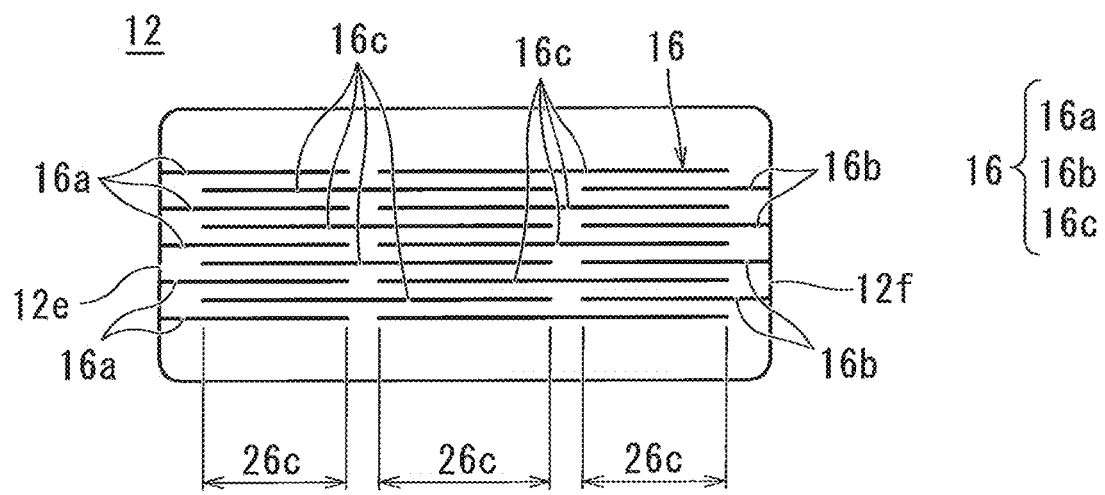
FIG. 4B is a sectional view taken along the line II-II in FIG. 1, and illustrating a structure in which a counter electrode portion of an internal electrode layer of a multilayer ceramic capacitor according to a preferred embodiment of the present invention is divided into three.
Figure 4C:
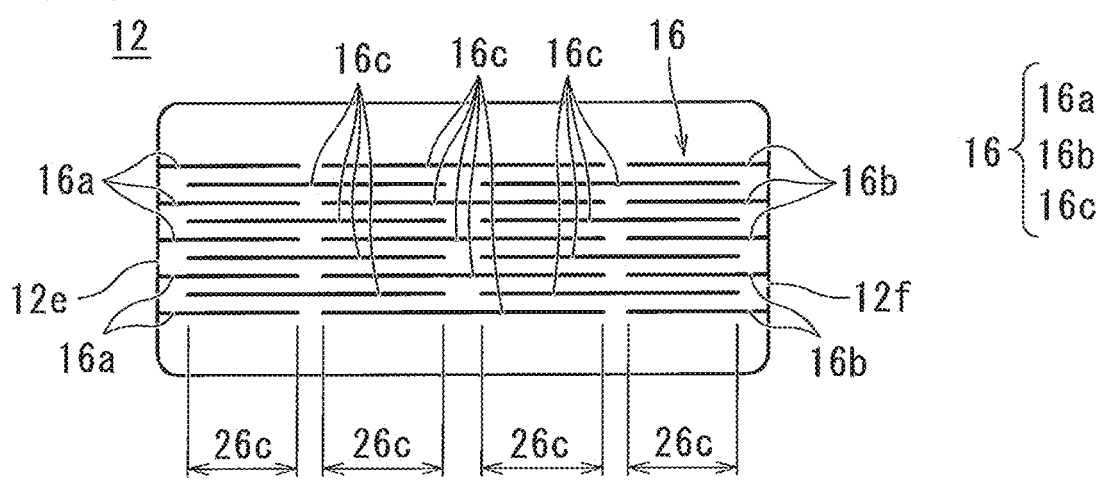
FIG. 4C is a sectional view taken along the line II-II in FIG. 1, and illustrating a structure in which a counter electrode portion of an internal electrode layer of a multilayer ceramic capacitor according to a preferred embodiment of the invention is divided into four.

A multilayer ceramic capacitor according to a preferred embodiment of the present invention will be described. FIG. 1 is an external perspective view illustrating an example of the multilayer ceramic capacitor according to the present preferred embodiment of the present invention. FIG. 2 is a sectional view taken along a line II-II in FIG. 1. FIG. 3 is a sectional view taken along a line III-III in FIG. 1. FIGS. 4A to 4C are enlarged sectional views of the view in FIG. 2.

As illustrated in FIGS. 1 to 3, a multilayer ceramic capacitor 10 includes a multilayer body 12 having a rectangular or substantially rectangular parallelepiped shape and external electrodes 30 disposed at both ends of multilayer body 12. As described later, external electrode 30 includes a first external electrode 30a and a second external electrode 30b.

Multilayer body 12 includes a plurality of dielectric layers 14 and a plurality of internal electrode layers 16. Furthermore, multilayer body 12 includes a first principal surface 12a and a second principal surface 12b that face each other in a height direction x, a first side surface 12c and a second side surface 12d that face each other in a width direction y orthogonal or substantially orthogonal to height direction x, and a first end surface 12e and a second end surface 12f that face each other in a length direction z orthogonal or substantially orthogonal to height direction x and width direction y. In multilayer body 12, a corner and a ridge are rounded. The corner is a portion where three adjacent surfaces of the multilayer body intersect with one another, and the ridge is a portion where two adjacent surfaces of the multilayer body intersect with each other. Irregularities or the like may be provided on a portion or all of first principal surface 12a and second principal surface 12b, first side surface 12c and second side surface 12d, and first end surface 12e and second end surface 12f.

Multilayer body 12 includes an effective portion 18 including one or a plurality of dielectric layers 14c and a plurality of internal electrode layers 16 disposed thereon. Internal electrode layer 16 includes a first internal electrode layer 16a extending to first end surface 12e and a second internal electrode layer 16b extending to second end surface 12f, and in effective portion 18, the plurality of first internal electrode layers 16a and the plurality of second internal electrode layers 16b face each other with dielectric layer 14c interposed therebetween.

Multilayer body 12 includes a first principal surface-side outer layer 20a that is located on the side of first principal surface 12a and including a plurality of dielectric layers 14a located between first principal surface 12a and an outermost surface of an inner layer 18 on the side of first principal surface 12a and on a straight or substantially straight line of the outermost surface.

Similarly, multilayer body 12 includes a second principal surface-side outer layer 20b that is located on the side of second principal surface 12b and including a plurality of dielectric layers 14b located between second principal surface 12b and the outermost surface of inner layer 18 on the side of second principal surface 12b and on a straight or substantially straight line of the outermost surface.

Multilayer body 12 includes a first side surface-side outer layer 22a that is located on the side of first side surface 12c and including a plurality of dielectric layers 14c located between first side surface 12c and the outermost surface of inner layer 18 on the side of first side surface 12c.

Similarly, multilayer body 12 includes a second side surface-side outer layer 22b that is located on the side of second side surface 12d and including the plurality of dielectric layers 14c located between second side surface 12d and the outermost surface of inner layer 18 on the side of second side surface 12d.

Multilayer body 12 includes a first end surface-side outer layer 24a that is located on the side of first end surface 12e and including the plurality of dielectric layers 14c located between first end surface 12e and the outermost surface of inner layer 18 on the side of first end surface 12e.

Similarly, multilayer body 12 includes a second end surface-side outer layer 24b that is located on the second end surface 12f side and including the plurality of dielectric layers 14c located between second end surface 12f and the outermost surface of inner layer 18 on the side of second end surface 12f.

The first principal surface-side outer layer 20a is located on a side of first principal surface 12a of multilayer body 12, and includes the plurality of dielectric layers 14a located between first principal surface 12a and internal electrode layer 16 closest to first principal surface 12a.

Second principal surface-side outer layer 20b is located on the side of second principal surface 12b of multilayer body 12, and includes the plurality of dielectric layers 14b located between second principal surface 12b and internal electrode layer 16 closest to second principal surface 12b.

The dimension of multilayer body 12 is not particularly limited, but preferably, for example, the dimension in length direction z is greater than or equal to about 0.2 mm and less than or equal to about 10 mm, the dimension in width direction y is greater than or equal to about 0.1 mm and less than or equal to about 10 mm, and the dimension in height direction x is greater than or equal to about 0.1 mm and less than or equal to about 5 mm.

For example, dielectric layer 14 can be made of a dielectric material as a ceramic material. For example, a dielectric ceramic including a component such as $BaTiO_3$, $CaTiO_3$, $SrTiO_3$, or $CaZrO_3$ can be used as such a dielectric material. When the dielectric material is included as a main component, for example, a material to which an accessory component with a content smaller than that of the main component such as an Mn compound, an Fe compound, a Cr compound, a Co compound, or an Ni compound is added may be used depending on the desired characteristic of multilayer body 12.

Preferably, the thickness of dielectric layer 14 after baking is greater than or equal to about 0.5 μm and less than or equal to about 10 μm, for example.

A glass layer 15 is disposed inside first principal surface-side outer layer 20a and second principal surface-side outer layer 20b. Details will be described below.

First principal surface-side outer layer 20a includes a glass layer 15a disposed on dielectric layer 14a so as to face effective portion 18. Second principal surface-side outer layer 20b includes a glass layer 15b disposed on dielectric layer 14b so as to face effective portion 18.

Accordingly, in multilayer ceramic capacitor 10 mounted on the mounting substrate, even when a temperature change is generated and a stress is applied to multilayer body 12 due to a difference in thermal expansion coefficient between the mounting substrate and multilayer body 12 to generate a crack in multilayer body 12 itself, the stress can be absorbed by glass layers 15a, 15b, and the crack can be prevented from extending to internal electrode layer 16 included in effective portion 18. As a result, the short-circuit failure can be prevented.

Glass layers 15a, 15b overlap a tip of first external electrode 30a and a tip of second external electrode 30b that are disposed on a portion of first principal surface 12a, a portion of second principal surface 12b, a portion of first side surface 12c, and a portion of second side surface 12d when viewed in the height direction. Accordingly, even the crack from the tip of external electrode 30 on which thermal shrinkage of the mounting substrate on which multilayer ceramic capacitor 10 is mounted or stress applied during bending of the mounting substrate tends to be concentrated can be released to glass layers 15a, 15b. As a result, the short-circuit failure can be prevented.

Glass layers 15a, 15b are preferably disposed inside multilayer body 12 so as to be, for example, less than or equal to about 50% of the dimension in length direction z connecting first end surface 12e and second end surface 12f of first end surface-side outer layer 24a and second end surface-side outer layer 24b from the side of effective portion 18. The length in length direction z of each of glass layers 15a, 15b is greater than or equal to the length in length direction z of effective portion 18, and is disposed inside multilayer body 12. In other words, glass layers 15a, 15b are disposed so as not to be exposed on first end surface 12e and second end surface 12f of multilayer body 12. Thus, even if the crack is generated and moisture intrudes from the portion where the crack is generated, not only the crack but also the moisture can be retained in glass layers 15a, 15b. Accordingly, the moisture can be prevented from reaching the interface between multilayer body 12 and external electrode 30, which is likely to define and function as a path for moisture to enter the inside of effective portion 18. As a result, the moisture resistance reliability of multilayer ceramic capacitor 10 can be maintained.

At this point, calculation of the ratio with respect to the dimension in length direction z connecting first end surface 12e and second end surface 12f of first end surface-side outer layer 24a and second end surface-side outer layer 24b from the side of effective portion 18 of glass layer 15 is performed by the following method.

First, in multilayer ceramic capacitor 10 that is a sample, sectional polishing is performed such that an LT surface of the multilayer ceramic capacitor is exposed to a position corresponding to about ½w of a dimension w in width direction y of multilayer body 12 along a plane direction parallel or substantially parallel to the side surface of multilayer body 12.

Subsequently, in first end surface-side outer layer 24a, a point at a tip on the side of first end surface 12e located closest to first principal surface 12a of second internal electrode layer 16b on the side not exposed on first end surface 12e, a point at a tip on the side of first end surface 12e located at about ½t of a dimension t in height direction x of multilayer body 12 of second internal electrode layer 16b on the side not exposed on first end surface 12e, and a point at a tip on the side of first end surface 12e located closest to second principal surface 12b of second internal electrode layer 16b on the side not exposed on first end surface 12e are taken, a middle line of the points is taken in an extension direction, and a reference line A1 is drawn as illustrated in FIG. 2.

Subsequently, a point located closest to side of first principal surface 12a of first internal electrode layer 16a exposed on first end surface 12e, a point located at about ½t point of dimension t in height direction x of multilayer body 12 of first internal electrode layer 16a exposed on first end surface 12e, and a point located closest to the side of second principal surface 12b of first internal electrode layer 16a exposed on first end surface 12e are taken, a middle line of the points is taken in the extension direction, and a reference line A2 is drawn as illustrated in FIG. 2.

A distance in a direction connecting first end surface 12e and second end surface 12f between reference line A1 and reference line A2 is defined as a distance L1.

Similarly, in second end surface-side outer layer 24b, a point at the tip on the side of second end surface 12f located closest to first principal surface 12a of first internal electrode layer 16a on the side not exposed on second end surface 12f, a point at the tip on the side of second end surface 12f located at about ½t of dimension t in height direction x of multilayer body of the first internal electrode layer 16a on the side not exposed on second end surface 12f, and a point at the tip on the side of second end surface 12f located closest to second principal surface 12b of first internal electrode layer 16a on the side not exposed on second end surface 12f are taken, and a middle line of the points is taken in the extension direction, and a reference line A3 is drawn as illustrated in FIG. 2.

Subsequently, a point located closest to the side of first principal surface 12a of second internal electrode layer 16b exposed on second end surface 12f, a point located at about ½t of dimension t in height direction x of multilayer body 12 of second internal electrode layer 16b exposed on second end surface 12f, and a point located closest to the side of second principal surface 12b of second internal electrode layer 16b exposed on second end surface 12f are taken, a middle line of the points is taken in the extension direction, and a reference line A4 is drawn as illustrated in FIG. 2.

A distance in the direction connecting first end surface 12e and second end surface 12f between reference line A3 and reference line A4 is defined as a distance L2.

L that is an average value of distance L1 and distance L2 measured by the above-described method is defined as each of the distance of the first end surface-side outer layer 24a and the distance of the second end surface-side outer layer 24b.

Subsequently, a distance B1 from reference line A1 to an end of glass layer 15a protruding toward the side of first end surface 12e and a distance B2 from reference line A3 to an end of glass layer 15a protruding toward the side of second end surface 12f are measured in glass layer 15a located in first principal surface-side outer layer 20a as illustrated in FIG. 2.

Similarly, a distance B3 from reference line A1 to an end portion of glass layer 15b protruding toward the side of first end surface 12e and a distance B4 from reference line A3 to an end of glass layer 15b protruding toward the side of second end surface 12f are measured in the glass layer 15b located in the second principal surface-side outer layer 20b as illustrated in FIG. 2.

B that is an average value of distances B1, B2, B3, and B4 is defined as a length of glass layer 15 protruding from effective portion 18.

Then, using L and B defined as described above, B/L is calculated as a ratio with respect to the dimension in length direction z connecting first end surface 12e and second end surface 12f of first end surface-side outer layer 24a and second end surface-side outer layer 24b from the side of effective portion 18 of glass layer 15, and the ratio is defined as a length ratio with respect to the dimension in length direction z connecting first end surface 12e and second end surface 12f of first end surface-side outer layer 24a and second end surface-side outer layer 24b from the side of effective portion 18 of glass layer 15.

Glass layers 15a, 15b are disposed in multilayer body 12 so as not to exceed about 50% of the dimension in width direction y connecting first side surface 12c and second side surface 12d of first side surface-side outer layer 22a and second side surface-side outer layer 22b from the side of effective portion 18 even in first side surface-side outer layer 22a and second side surface-side outer layer 22b. The length in width direction y of each of glass layers 15a, 15b is greater than or equal to the length in width direction y of effective portion 18, and glass layers 15a, 15b are disposed in multilayer body 12. In other words, glass layers 15a, 15b are disposed so as not to be exposed on first side surface 12c and second side surface 12d of multilayer body 12. Thus, even if a crack is generated and the moisture intrudes from the portion where the crack is generated, not only the crack but also the moisture can be retained in glass layers 15a, 15b. Accordingly, the moisture can be prevented from reaching the interface between multilayer body 12 and external electrode 30, which is likely to defined and function as a path for moisture to enter the inside of effective portion 18. As a result, the moisture resistance reliability of multilayer ceramic capacitor 10 can be maintained.

The thickness of glass layer 15 in height direction x connecting first principal surface 12a and second principal surface 12b is preferably greater than or equal to about 0.2 μm and less than or equal to about 13 μm, for example. When the thickness range of glass layer 15 is greater than or equal to about 0.2 μm and less than or equal to about 13 μm, the crack is induced toward glass layer 15, and extension of the crack to internal electrode layer 16 can be effectively prevented. As a result, the short-circuit failure can be prevented in multilayer body 12, and the moisture resistance reliability of multilayer ceramic capacitor 10 can be maintained.

On the other hand, when the thickness of glass layer 15 is less than about 0.2 μm, the effect of absorbing the stress (cracks) is reduced, and sometimes the crack reaches internal electrode layer of effective portion 18. In addition, when the thickness of glass layer 15 is greater than about 13 μm, adhesion strength between dielectric layers 14 is reduced, and a structural defect may be generated.

The thicknesses of glass layers 15a, 15b are measured by the following method.

That is, first, in multilayer ceramic capacitor 10, the sectional polishing is performed such that an LT surface of multilayer ceramic capacitor 10 is exposed to a position corresponding to about ½w of the dimension w in width direction y of multilayer body 12 along the plane direction parallel or substantially parallel to the side surface of multilayer body 12. Subsequently, an SEM image is photographed using a scanning electron microscope at the central portion of glass layer 15a on the side of first principal surface-side outer layer 20a in a polished section. The photographing range at this time is about 20 μm×about 15 μm, and magnification is about 6000 times, for example. Glass layer 15a is divided at 5 points at equal or substantially equal intervals in the dimension in length direction z within this range, and the thickness of glass layer 15a is measured at the 5 portions. Similarly, the SEM image is photographed using the scanning electron microscope at the central portion of glass layer 15b on the side of second principal surface-side outer layer 20b in the polished section. The photographing range at this time is about 20 μm×about 15 μm, and magnification is about 6000 times, for example. Glass layer 15b is divided a 5 points at equal or substantially equal intervals in the dimension in length direction z within this range, and the thickness of glass layer 15b is measured at the 5 portions. At this point, an average value of a total of 10 points of the five points of glass layer 15a on the side of first principal surface-side outer layer 20a and the five points of glass layer 15b on the side of second principal surface-side outer layer 20b is calculated, and the value is taken as the thickness of glass layer 15 of the first principal surface-side outer layer 20a and the second principal surface-side outer layer 20b.

Vickers hardness of glass layer 15 is preferably lower than Vickers hardness of dielectric layer 14. Thus, the crack can be prevented from extending to internal electrode layer 16 disposed in effective portion 18. As a result, the short-circuit failure can be prevented in multilayer body 12, and the moisture resistance reliability of multilayer ceramic capacitor 10 can be maintained.

The Vickers hardness of glass layer 15 is preferably, for example, less than about 8 GPa that is the Vickers hardness of dielectric layer 14. Accordingly, the advantageous effects of preferred embodiments of the present invention can be more effectively achieved.

The Vickers hardness of glass layer 15 is measured by the method described below.

That is, for the Vickers hardness of glass layer 15, first, in multilayer ceramic capacitor 10, the sectional polishing is performed such that the LT surface of multilayer ceramic capacitor 10 is exposed to a position of about ½w dimension of dimension w in width direction y of multilayer body 12 along a plane direction parallel or substantially parallel to the side surface of multilayer body 12. Subsequently, at the central portion of glass layer 15a on the side of first principal surface-side outer layer 20a in the polished section, a Vickers indenter is pressed against glass layer 15a to measure the Vickers hardness of glass layer 15a on the side of first principal surface-side outer layer 20a using a microhardness meter. Subsequently, at the central portion of glass layer 15b on the side of second principal surface-side outer layer 20b in the polished section, the Vickers indenter is pressed against glass layer 15b to measure the Vickers hardness of glass layer 15b on the side of second principal surface-side outer layer 20b using the microhardness meter. At this point, an average value of the Vickers hardness of glass layer 15a on the side of first principal surface-side outer layer 20a and the Vickers hardness of glass layer 15b on the side of second principal surface-side outer layer 20b is calculated, and the value is taken as the Vickers hardness of glass layer 15 of multilayer ceramic capacitor 10.

On the other hand, the Vickers hardness of dielectric layer 14 is measured by a method described below.

That is, for the Vickers hardness of dielectric layer 14, first, in multilayer ceramic capacitor 10, the sectional polishing is performed such that the LT surface of multilayer ceramic capacitor 10 is exposed to a position of about ½w dimension of dimension w in width direction y of multilayer body 12 along a plane direction parallel or substantially parallel to the side surface of multilayer body 12. Subsequently, at the central portion on the side of first principal surface-side outer layer 20a in the polished section, the Vickers indenter is pressed against dielectric layer 14a to measure the Vickers hardness of dielectric layer 14a on the side of first principal surface-side outer layer 20a using the microhardness meter. Subsequently, at the central portion on the side of second principal surface-side outer layer 20b in the polished section, the Vickers indenter is pressed against dielectric layer 14b to measure the Vickers hardness of dielectric layer 14b on the side of second principal surface-side outer layer 20b using the microhardness meter. At this point, an average value of the Vickers hardness of dielectric layer 14a on the side of first principal surface-side outer layer 20a and the Vickers hardness of dielectric layer 14b on the side of second principal surface-side outer layer 20b is calculated, and the value is taken as the Vickers hardness of dielectric layer 14 of multilayer ceramic capacitor 10.

Any glass such as, for example, borosilicate glass, alkali silicate glass, or alkaline earth silicate glass can be used as the glass for glass layer 15. Among others, for example, glass including an alkali metal and having a low ion filling rate in glass is preferable. Thus, the strength of the glass can be reduced, and an effect of easily releasing the crack can be obtained.

For example, multilayer body 12 includes a plurality of first internal electrode layers 16a and a plurality of second internal electrode layers 16b having a rectangular or substantially rectangular shape as the plurality of internal electrode layers 16. The plurality of first internal electrode layers 16a and the plurality of second internal electrode layers 16b are embedded so as to be alternately arranged at equal or substantially equal intervals with dielectric layer 14 interposed therebetween along height direction x of multilayer body 12.

First internal electrode layer 16a includes a first counter electrode 26a facing second internal electrode layer 16b and a first extracting electrode 28a located on one end side of first internal electrode layer 16a and extending from first counter electrode 26a to first end surface 12e of multilayer body 12. An end of first extracting electrode 28a extends to first end surface 12e and is exposed.

A shape of first counter electrode 26a of first internal electrode layer 16a is not particularly limited, but is preferably rectangular or substantially rectangular when viewed in the height direction. However, the corners may be rounded when viewed in the height direction, or extending obliquely when viewed in the height direction (tapered). In addition, the corners may have a tapered shape when viewed in the height direction in which an inclination extends in either direction.

The shape of first extracting electrode 28a of first internal electrode layer 16a is not particularly limited, but is preferably rectangular or substantially rectangular when viewed in the height direction. However, the corners may be rounded when viewed in the height direction, or extending obliquely when viewed in the height direction (tapered). In addition, the corners may have a tapered shape when viewed in the height direction in which an inclination extends in either direction.

A width of first counter electrode 26a of first internal electrode layer 16a and a width of first extracting electrode 28a of first internal electrode layer 16a may be the same, or either one of the widths may be less than the other one.

Second internal electrode layer 16b includes a second counter electrode 26b that faces first internal electrode layer 16a and a second extracting electrode 28b that is located on one end side of second internal electrode layer 16b and extends from second counter electrode 26b to second end surface 12f of multilayer body 12. The end of second extracting electrode 28b extends to second end surface 12f and is exposed.

The shape of second counter electrode 26b of the second internal electrode layer 16b is not particularly limited, but is preferably rectangular or substantially rectangular when viewed in the height direction. However, the corners may be rounded when viewed in the height direction, or extend obliquely when viewed in the height direction (tapered). In addition, the corners may have a tapered shape when viewed in the height direction in which an inclination extends in either direction.

The shape of second extracting electrode 28b of second internal electrode layer 16b is not particularly limited, but is preferably rectangular or substantially rectangular when viewed in the height direction. However, the corners may be rounded when viewed in the height direction, or extend obliquely when viewed in the height direction (tapered). In addition, the corners may have a tapered shape when viewed in the height direction in which an inclination extends in either direction.

The width of second counter electrode layer 26b of the second internal electrode layer 16b and the width of second extracting electrode 28b of second internal electrode layer 16b may be the same, or either one of the widths may be less than the other one.

First internal electrode layer 16a and second internal electrode layer 16b can be made of an appropriate conductive material of a metal such as, for example, Ni, Cu, Ag, Pd, or Au or an alloy including at least one of these metals such as an Ag—Pd alloy.

The thickness of each of internal electrode layers 16, namely, first internal electrode layers 16a and second internal electrode layers 16b is preferably, for example, greater than or equal to about 0.2 µm and less than or equal to about 2.0 µm.

The numbers of first internal electrode layers 16a and second internal electrode layers 16b are preferably, for example, greater than or equal to 15 and less than or equal to 200 in total.

As illustrated in FIGS. 1 to 3, external electrode 30 is disposed on the side of first end surface 12e side and the side of second end surface 12f of multilayer body 12.

External electrode 30 includes a ground electrode layer 32 including a metal component and a glass component and a plating layer 34 formed on the surface of ground electrode layer 32.

External electrode 30 includes a first external electrode 30a and a second external electrode 30b.

First external electrode 30a is connected to first internal electrode layer 16a and disposed on the surface of first end surface 12e. In addition, first external electrode 30a extends from first end surface 12e and is also disposed on a portion of first principal surface 12a and a portion of second principal surface 12b and a portion of first side surface 12c and a portion of second side surface 12d. In this case, first external electrode 30a is electrically connected to first extracting electrode 28a of first internal electrode layer 16a.

Second external electrode 30b is connected to second internal electrode layer 16b and disposed on the surface of second end surface 12f. Second external electrode 30b extends from second end surface 12f and is also disposed on a portion of first principal surface 12a and a portion of second principal surface 12b and a portion of first side surface 12c and a portion of second side surface 12d. In this case, second external electrode 30b is electrically connected to second extracting electrode 28b of second internal electrode layer 16b.

In multilayer body 12, first counter electrode 26a of first internal electrode layer 16a and second counter electrode 26b of second internal electrode layer 16b face each other with dielectric layer 14c interposed therebetween, thus generating electrostatic capacitance. For this reason, the electrostatic capacitance can be obtained between first external electrode 30a to which first internal electrode layer 16a is connected and second external electrode 30b to which second internal electrode layer 16b is connected, and the characteristics of the capacitor are provided.

As illustrated in FIGS. 4A to 4C, multilayer body 12 in FIG. 1 may have a structure in which, in addition to first internal electrode layer 16a and second internal electrode layer 16b, a floating internal electrode layer 16c does not extend to either first end surface 12e or second end surface 12f is provided, and a counter electrode 26c is divided into a plurality of portions by floating internal electrode layer 16c. For example, a double structure in FIG. 4A, a triple structure in FIG. 4B, and a quadruple structure in FIG. 4C may be provided. In this way, by having a structure in which counter electrode 26c is divided into the plurality of portions, a plurality of capacitor components are provided among opposing internal electrode layers 16a, 16b, 16c, and these capacitor components are connected in series. For this reason, the voltage applied to each capacitor component decreases, and a withstand voltage of multilayer ceramic capacitor 10 can be increased.

Ground electrode layer 32 includes at least one of a baked layer, a thin film layer, and the like, for example.

Each configuration when ground electrode layer 32 is the baked layer and the thin film layer will be described below.

Ground electrode layer 32 includes a first ground electrode layer 32a and a second ground electrode layer 32b.

First ground electrode layer 32a is connected to first internal electrode layer 16a and disposed on the surface of first end surface 12e. In addition, first ground electrode layer 32a extends from first end surface 12e and is also disposed on a portion of first principal surface 12a and a portion of second principal surface 12b and a portion of first side surface 12c and a portion of second side surface 12d. In this case, first ground electrode layer 32a is electrically connected to first extracting electrode 28a of first internal electrode layer 16a.

Second ground electrode layer 32b is connected to second internal electrode layer 16b and disposed on the surface of second end surface 12f. Second ground electrode layer 32b extends from second end surface 12f and is also disposed on a portion of first principal surface 12a and a portion of second principal surface 12b, and a portion of first side surface 12c and a portion of second side surface 12d. In this case, second ground electrode layer 32b is electrically connected to second extracting electrode 28b of second internal electrode layer 16b.

Case of Baked Layer

The baked layer includes a glass component and a metal component. For example, the glass component of the baked layer includes at least one selected from B, Si, Ba, Mg, Al, Li, and the like. For example, the metal component of the baked layer includes at least one selected from Cu, Ni, Ag, Pd, an Ag-Pd alloy, Au, and the like. The baked layer is obtained by applying a conductive paste including the glass component and the metal component to multilayer body 12. A multilayer chip including internal electrode layer 16 and dielectric layer 14 and a conductive paste applied to the multilayer chip may be simultaneously baked, or the conductive paste may be applied to multilayer body 12 and baked after the multilayer chip having internal electrode layer 16 and dielectric layer 14 may be baked to obtain multilayer body 12. When the multilayer chip including internal electrode layer 16 and dielectric layer 14 as the baked layer and the conductive paste applied to the multilayer chip are simultaneously baked, the baked layer is preferably, for example, formed by baking a layer obtained by adding a dielectric material instead of a glass component. The baked layer may include a plurality of layers.

For example, the thickness in length direction z connecting first end surface 12e and second end surface 12f at the central portion in height direction x of first ground electrode layer 32a located at first end surface 12e is preferably greater than or equal to about 3 μm and less than or equal to about 160 μm.

For example, the thickness in length direction z connecting first end surface 12e and second end surface 12f at the central portion in height direction x of second ground electrode layer 32b located on second end surface 12f is preferably greater than or equal to about 3 μm and less than or equal to about 160 μm.

In addition, for example, the thickness in height direction x connecting first principal surface 12a and second principal surface 12b at the central portion in length direction z connecting first end surface 12e and second end surface 12f of first ground electrode layer 32a located in a portion of first principal surface 12a and second principal surface 12b is preferably greater than or equal to about 3 μm and less than or equal to about 40 μm, for example.

In addition, for example, the thickness in height direction x connecting first principal surface 12a and second principal surface 12b at the central portion in length direction z connecting first end surface 12e and second end surface 12f of second ground electrode layer 32b located in a portion of first principal surface 12a and second principal surface 12b is preferably greater than or equal to about 3 μm and less than or equal to about 40 μm.

In addition, for example, the thickness in width direction y connecting first side surface 12c and second side surface 12d at the central portion in length direction z connecting first end surface 12e and second end surface 12f of first ground electrode layer 32a located in a portion of first side surface 12c and second side surface 12d is preferably greater than or equal to about 3 μm and less than or equal to about 40 μm.

In addition, for example, the thickness in width direction y connecting first side surface 12c and second side surface 12d at the central portion in length direction z connecting first end surface 12e and second end surface 12f of second ground electrode layer 32b located in a portion of first side surface 12c and second side surface 12d is preferably greater than or equal to about 3 μm and less than or equal to about 40 μm.

Case of Thin Film Layer

When ground electrode layer 32 is a thin film layer, the thin film layer is formed by a thin film forming method such as, for example, a sputtering method or an evaporation method, and metal particles are deposited and formed.

Plating layer 34 includes a first plating layer 34a and a second plating layer 34b.

First plating layer 34a and second plating layer 34b may include a plurality of layers.

First plating layer 34a covers first ground electrode layer 32a.

Second plating layer 34b covers second ground electrode layer 32b.

For example, plating layer 34 includes at least one selected from Cu, Ni, Sn, Ag, Pd, an Ag—Pd alloy, Au, and the like.

Plating layer 34 may include a plurality of layers. Preferably plating layer 34 has a two-layer structure of a lower plating layer and an upper plating layer. For example, the lower plating layer is preferably a Ni plating layer, and the upper plating layer is preferably a Sn plating layer. The Ni plating layer can prevent ground electrode layer 32 from being eroded by solder when multilayer ceramic capacitor 10 is mounted, the Sn plating layer can improve wettability of the solder when multilayer ceramic capacitor 10 is mounted, and multilayer ceramic capacitor 10 can be easily mounted on the mounting substrate.

The thickness per layer of plating layer 34 is preferably greater than or equal to about 1 μm and less than or equal to about 15 μm, for example.

External electrode 30 may include only the plating layer without providing ground electrode layer 32.

Hereinafter, a structure in which the plating layer is provided without providing ground electrode layer 32 will be described below.

In each of first external electrode 30a and second external electrode 30b, the plating layer may be directly provided on the surface of multilayer body 12 without providing ground electrode layer 32. That is, multilayer ceramic capacitor 10 may have a structure including the plating layer electrically connected directly to first internal electrode layer 16a and second internal electrode layer 16b. In such a case, the plating layer may be provided after a catalyst is disposed on the surface of multilayer body 12 as pretreatment.

When the plating layer is directly provided on multilayer body 12 without providing ground electrode layer 32, the reduced thickness of ground electrode layer 32 can reduce the height, or increase the thickness of effective portion 18, so that the degree of freedom in designing the thin chip can be improved.

The plating layer preferably includes a lower plating electrode on the surface of multilayer body 12 and an upper plating electrode on the surface of the lower plating electrode.

For example, each of the lower plating electrode and the upper plating electrode preferably includes at least one metal selected from Cu, Ni, Sn, Pb, Au, Ag, Pd, Bi, Zn, or the like, or an alloy containing the metal.

The lower plating electrode is preferably made of, for example, Ni having solder barrier performance, and the upper plating electrode is preferably made of, for example, Sn or Au having good solder wettability.

For example, when first internal electrode layer 16a and second internal electrode layer 16b are made of Ni, the ground plating electrode is preferably made of Cu having good bondability with Ni. The upper plating electrode may be provided as necessary, and each of first external electrode 30a and second external electrode 30b may include only the lower plating electrode.

As the plating layer, the upper plating electrode may be used as the outermost layer, or another plating electrode may be further provided on the surface of the upper plating electrode.

Preferably, the thickness of the plating is greater than or equal to about 1 μm and less than or equal to about 15 μm, for example.

The plating layer preferably does not include glass. The metal ratio per unit volume of the plating layer is preferably greater than or equal to about 99 vol %, for example.

The dimension in length direction z of multilayer ceramic capacitor 10 including multilayer body 12, first external electrode 30a, and second external electrode 30b is defined as an L dimension, the dimension in height direction x of multilayer ceramic capacitor 10 including multilayer body 12, first external electrode 30a, and second external electrode 30b is defined as a T dimension, and the dimension in width direction y of multilayer ceramic capacitor 10 including multilayer body 12, first external electrode 30a, and second external electrode 30b is defined as a W dimension.

For example, multilayer ceramic capacitor 10 is greater than or equal to about 0.2 mm and less than or equal to about 10.0 mm in the L dimension in length direction z, is greater than or equal to about 0.1 mm and less than or equal to about 5.0 mm in the W dimension in width direction y, and is greater than or equal to about 0.05 mm and less than or equal to about 5.0 mm in the T dimension in height direction x. The dimensions of multilayer ceramic capacitor 10 can be measured with a microscope.

In multilayer ceramic capacitor 10 of FIG. 1, first principal surface-side outer layer 20a and second principal surface-side outer layer 20b include glass layer 15 disposed on dielectric layer 14 so as to face effective portion 18, and glass layer 15 is disposed so as to overlap with the tip of first external electrode 30a and the tip of second external electrode 30b disposed on a portion of first principal surface 12a, a portion of second principal surface 12b, a portion of first side surface 12c, and a portion of second side surface 12d when viewed in the height directionin plan view, and glass layer 15 is disposed so as not to be exposed from the side of effective portion 18 to first end surface 12e and second end surface 12f, so that the extension of the crack to effective portion 18 can be prevented. As a result, the moisture resistance reliability of multilayer ceramic capacitor 10 can be improved.

2. Method for Manufacturing Multilayer Ceramic Capacitor

A non-limiting example of a method for manufacturing the multilayer ceramic capacitor will be described below.

First, a dielectric sheet for a dielectric layer and conductive paste for an internal electrode layer are prepared. The dielectric sheet and the conductive paste for the internal electrode layer include a binder and a solvent. The binder and the solvent may be known.

Then, the conductive paste for the internal electrode layer is printed on the dielectric sheet in a predetermined pattern by, for example, screen printing or gravure printing. Thus, the dielectric sheet on which the pattern of the first internal electrode layer is formed and the dielectric sheet on which the pattern of the second internal electrode layer is formed are prepared.

The glass paste is printed on the dielectric sheet in a predetermined pattern by, for example, screen printing or gravure printing. Thus, the dielectric sheet on which the pattern of the glass layer is formed is prepared. The thickness of the glass layer can be controlled by changing the thickness of a printing plate. The hardness of the glass layer can be controlled by changing a glass composition ratio. Furthermore, regarding the dielectric sheet, a dielectric sheet for an outer layer on which a pattern of an internal electrode layer is not printed is also prepared.

Subsequently, a predetermined number of dielectric sheets for outer layers on which the pattern of the internal electrode layer is not printed is laminated to form a portion that becomes the second principal surface-side outer layer on the second principal surface side. At this point, when the portion that becomes the second principal surface-side outer layer is formed, the glass layer can be formed in the second principal surface-side outer layer by laminating the dielectric sheet on which the pattern of the glass layer is formed at an arbitrary position where the glass layer is provided. Then, the dielectric sheet on which the pattern of the first internal electrode layer is printed and the dielectric sheet on which the pattern of the second internal electrode layer is printed are sequentially laminated on the portion that becomes the second principal surface-side outer layer so as to have the structure of the present invention, thus forming the portion that becomes the effective portion. The portion that becomes the first principal surface-side outer layer on the first main surface side is formed by laminating the predetermined number of dielectric sheets for the outer layers on which the pattern of the internal electrode layer is not printed on the portion that becomes the effective portion. At this point, when the portion that becomes the first principal surface-side outer layer is formed, the glass layer can be formed in the first principal surface-side outer layer by laminating the dielectric sheet on which the pattern of the glass layer is formed at an arbitrary position where the glass layer is provided. Thus, the multilayer sheet including the glass layer is prepared.

Subsequently, the multilayer sheet is pressed in a laminating direction by, for example, isostatic pressing to prepare a multilayer block.

Then, the multilayer block is cut into a predetermined size to cut out a multilayer chip. At this point, the corner and the ridge of the multilayer chip may be rounded by barrel polishing or the like, for example.

Subsequently, the multilayer chip is baked to produce multilayer body 12. The baking temperature depends on the materials of dielectric layer 14 and internal electrode layer 16 that are dielectrics, but is preferably greater than or equal to about 900° C. and less than or equal to about 1400° C., for example.

Subsequently, the conductive paste that becomes the ground electrode layer is applied to both end surfaces of the multilayer body. In the present preferred embodiment, the ground electrode layer is, for example, a baked layer. The conductive paste including the glass component and the metal is applied to the multilayer body by, for example, a method such as dipping. Then, baking processing is performed to form the ground electrode layer. The temperature of the baking processing at this time is preferably greater than or equal to about 700° C. and less than or equal to about 900° C., for example.

When the ground electrode layer is formed as a thin film layer, the ground electrode layer can be formed by a thin film forming method such as, for example, a sputtering method or an evaporation method. The ground electrode layer formed of the thin film layer is a layer having a thickness of, for example, less than or equal to about 1 μm on which metal particles are deposited.

Subsequently, the plating layer is formed. The plating layer may be formed on the surface of the ground electrode layer, or directly formed on the multilayer body. In the present preferred embodiment, the plating layer is formed on the surface of the ground electrode layer. More specifically, the Ni plating layer and the Sn plating layer are formed on the ground electrode layer. The Ni plating layer and the Sn plating layer are sequentially formed by, for example, a barrel plating method.

On the other hand, the plating layer may be provided on the exposed portion of the internal electrode layer of the multilayer body without providing the ground electrode layer. In this case, for example, it can be formed by the following method.

That is, the plating processing is applied to the first end surface and the second end surface of the multilayer body to form the lower plating electrode on the exposed portion of the internal electrode layer. In performing the plating processing, either electrolytic plating or electroless plating may be used. However, the electroless plating requires preprocessing using a catalyst or the like in order to improve the plating deposition rate, and has a disadvantage that the process becomes complicated. Accordingly, it is usually preferable to adopt the electrolytic plating. As required, the upper plating electrode formed on the surface of the lower plating electrode may be similarly formed.

As described above, multilayer ceramic capacitor 10 of the present preferred embodiment is manufactured.

3. Experimental Example 1

The multilayer ceramic capacitor was prepared according to the manufacturing method described above, and evaluated by checking presence or absence of a crack in the multilayer body and performing a moisture resistance reliability test. The evaluation based on the presence or absence of the crack in the multilayer body was performed by checking the presence or absence of the crack in the internal direction of the multilayer body and checking the presence or absence of the crack in the effective portion.

(a) Specification of Sample of Example

The multilayer ceramic capacitors having the following specifications were prepared as an example. The prepared samples of examples 1 to 8 were obtained by changing the length in length direction z of the glass layer as illustrated in Table 1. More particularly, the ratio of the length to the dimension in length direction z connecting the first end surface and the second end surface of the first end surface-side outer layer and the second end surface-side outer layer from the effective portion side of the glass layer was changed.

Dimensions (design value) of multilayer ceramic capacitor: L×W×T=about 1.0 mm×about 0.5 mm×about 0.5 mm Specification of dielectric layer Material of the main component of dielectric layer: $BaTiO_3$ Layer thickness of dielectric layer: about 1.5 μm Vickers hardness of dielectric layer: about 8.0 GPa Specification of glass layer Glass type of glass layer: $Na_2O\text{-}SiO_2$-based glass, and $40Na_2O\text{-}60SiO_2$ Thickness of glass layer: about 5 μm Range in which glass layer is provided: see Table 1

Vickers hardness of glass layer: about 7.7 GPa

Specification of internal electrode layer

Material of internal electrode layer: Ni

Specifications of external electrode layer

Specification of ground electrode layer

Ground electrode layer: baked layer including conductive metal (Cu) and glass component Thickness in length direction z at central portion in height direction x of baking layer located on first end surface and second end surface: about 30 μm Thickness in height direction x connecting first principal surface and second principal surface at central portion in length direction z of baking layer located on first principal surface and second principal surface (thickness of ground electrode layer at central portion in e dimension): about 10 μm Thickness in width direction y connecting first side surface and second side surface at central portion in length direction z of baking layer located on first side surface and second side surface (thickness of ground electrode layer at central portion in e dimension): about 10 μm Specification of Lower Plating Layer Lower plating layer: Ni plating layer Thickness in length direction z at central part in height direction x of lower plating layer located on first end surface and second end surface: about 3 μm Thickness in height direction x connecting first principal surface and second principal surface at central portion in length direction z of lower plating layer located on first principal surface and second principal surface (thickness of ground electrode layer at central portion in e dimension): about 3 μm Thickness in width direction y connecting first side surface and second side surface at central portion in length direction z of lower plating layer located on first side surface and second side surface (thickness of ground electrode layer at central portion in e dimension): about 3 μm Specification of Upper Plating Layer Upper plating layer: Sn plating layer Thickness in length direction z at central portion in height direction x of upper plating layer located on first end surface and second end surface: about 3 μm Thickness in height direction x connecting first principal surface and second principal surface at central portion in length direction z of upper plating layer located on first principal surface and second principal surface (thickness of ground electrode layer at central portion in e dimension): about 4 μm Thickness in width direction y connecting first side surface and second side surface at central portion in length direction z of upper plating layer located on first side surface and second side surface (thickness of ground electrode layer at central portion in e dimension): about 4 μm (b) Specification of Sample of Comparative Example A multilayer ceramic capacitor including no glass layer was prepared as a comparative example. In the comparative example, the specification was the same as that of the example, except that the glass layer was not provided.

(c) Measurement and Test Method

A method for calculating ratio to dimension in length direction z connecting first end surface and second end surface of first end surface-side outer layer and second end surface-side outer layer from effective portion side of glass layer is described below.

First, in the multilayer ceramic capacitor that is the sample of each of examples and comparative examples, the sectional polishing was performed such that the LT surface of the multilayer ceramic capacitor was exposed to the position corresponding to about ½w dimension of dimension w in width direction y of the multilayer body along the plane direction parallel to the side surface of the multilayer body.

Subsequently, in the first end surface-side outer layer, the point at the tip on the first end surface side located closest to the first principal surface side of the second internal electrode layer on the side not exposed on the first end surface, the point at the tip on the first end surface side located at about ½t of dimension t in height direction x of the multilayer body of the second internal electrode layer on the side not exposed on the first end surface, and the point at the tip on the first end surface side located closest to the second principal surface side of the second internal electrode layer on the side not exposed on the first end surface were taken, and the middle line of the points was taken in the extension direction to draw reference line A1.

Subsequently, the point located closest to the first principal surface side of the first internal electrode layer exposed on the first end surface, the point located at about ½t of dimension t in height direction x of the multilayer body of the first internal electrode layers exposed on the first end surface, and the point located closest to the second principal surface side of the first internal electrode layer exposed on the first end surface were taken, and the middle line of the points was taken in the extension direction to draw reference line A2.

At this point, the distance in the direction connecting the first end surface and the second end surface between reference line A1 and reference line A2 is defined as distance L1.

Similarly, in the second end surface-side outer layer, the point at the tip on the second end surface side located closest to the first principal surface side of the first internal electrode layer on the side not exposed on the second end surface, the point at the tip on the second end surface side located at about ½t of dimension t in height direction x of the multilayer body of the first internal electrode layer on the side not exposed on the second end surface, and the point at the tip on the second end surface side located closest to the second principal surface side of the first internal electrode layer on the side not exposed on the second end surface were taken, and the middle line of the points was taken in the extension direction to draw reference line A3.

Subsequently, the point located closest to the first principal surface side of the second internal electrode layer exposed on the second end surface, the point located at about ½t of dimension t in height direction x of the multilayer body of the second internal electrode layers exposed on the second end surface, and the point located closest to the second principal surface side of the second internal electrode layer exposed on the second end surface were taken, and the middle line of the points was taken in the extension direction to draw reference line A4.

At this point, the distance in the direction connecting the first end surface and the second end surface between reference line A3 and reference line A4 is defined as distance L2.

L that was the average value of distance L1 and distance L2 measured by the above-described method was defined as each of the distance of the first end surface-side outer layer and the distance of the second end surface-side outer layer.

Subsequently, distance B1 from reference line A1 to the end of the glass layer protruding toward the first end surface side and distance B2 from reference line A3 to the end of the glass layer protruding toward the second end surface side are measured in the glass layer located in the first principal surface-side outer layer.

Similarly, in the glass layer located in the second principal surface-side outer layer, distance B3 from reference line A1 to the end of the glass layer protruding toward the first end surface side and distance B4 from reference line A3 to the end of the glass layer protruding toward the second end surface side were measured.

B that is the average value of distances B1, B2, B3, and B4 is defined as the length of the glass layer protruding from the effective portion.

Then, using L and B defined as described above, B/L was calculated as a ratio with respect to the dimension in length direction z connecting the first end surface and the second end surface of the first end surface-side outer layer and the second end surface-side outer layer from the effective portion side of the glass layer, and the ratio was defined as the length ratio with respect to the dimension in length direction z connecting the first end surface and the second end surface of the first end surface-side outer layer and the second end surface-side outer layer from the effective portion side of the glass layer.

Method for Checking Presence or Absence of Crack in Laminate

The method for checking the presence or absence of the crack in the multilayer body was performed by the method described below.

That is, first, the multilayer ceramic capacitor that is the sample of each of the examples and comparative examples were mounted on the mounting substrate having a thickness of, for example, about 1.6 mm using the solder paste.

Method for Checking Presence or Absence of Crack in Effective Portion

The crack in the effective portion was checked in the same or substantially the same manner as the method for checking the presence or absence of the crack in the multilayer body, and when the crack extending to the effective portion was observed, it was determined that the crack was present in the effective portion.

Method for Testing Moisture Resistance Reliability

The moisture resistance reliability test was performed by the method described below.

That is, first, the multilayer ceramic capacitor that is the sample of each of the examples and comparative examples was mounted on a glass epoxy substrate using solder. Then, each sample was subjected to a moisture resistance acceleration test under the conditions of, for example, about 6.3 V and about 1000 hours in a high-temperature and high-humidity tank at about 85° C. and relative humidity of about 85% RH, and an insulation resistance value was measured. At this point, the sample having an insulation resistance value (IR value) less than about 107 Ω was determined to be defective.

(d) Results

Table 1 illustrates B/L, the presence or absence of the crack in the multilayer body, the presence or absence of the crack in the effective portion, and the test results of the moisture resistance reliability test for each sample of examples 1 to 8.

TABLE 1

|  |  | Comparative Example | Example 1 | Example 2 | Example 3 | Example 4 | Example 5 | Example 6 | Example 7 | Example 8 |
|---|---|---|---|---|---|---|---|---|---|---|
| B/L | (%) | — | 0 | 10 | 25 | 40 | 50 | 60 | 85 | 100 |
| Presence or absence of crack to multilayer body | (piece) | 7/10 | 5/10 | 4/10 | 5/10 | 6/10 | 5/10 | 6/10 | 3/10 | 5/10 |
| Presence or absence of crack to effective portion | (piece) | 6/10 | 0/10 | 0/10 | 0/10 | 0/10 | 0/10 | 0/10 | 0/10 | 0/10 |
| Moisture resistance reliability test | (piece) | 6/10 | 0/10 | 0/10 | 0/10 | 0/10 | 0/10 | 1/10 | 2/10 | 5/10 |

Then, the mounting substrate was bent with a push rod having a diameter of, for example, about 1 mm from a back surface of the mounting substrate on which the multilayer ceramic capacitor was not mounted, and mechanical stress was applied thereto. A holding time at this time was about 60 seconds, for example, and a bending amount was, for example, about 8 mm. In this test, the condition is stricter than the normal condition. After the substrate was bent, the multilayer ceramic capacitor that is of the sample was removed from the mounting substrate, and the sectional polishing was performed to observe the presence or absence of the crack. The sectional polishing was performed such that the LT surface of the multilayer ceramic capacitor was exposed to the position corresponding to about ½w of dimension w in width direction y of the multilayer body along the plane direction parallel to the side surface of the multilayer body of the multilayer ceramic capacitor. The observation magnification was set to, for example, 100 times. When the crack extending in the internal direction of the multilayer body was observed as a starting point from a vicinity of the tip of the external electrode positioned on the first principal surface and the second principal surface, it was determined that the crack was present in the multilayer body.

According to Table 1, in the samples of examples 1 to 8, the glass layer was disposed so as to overlap the tip of the first external electrode and the tip of the second external electrode, which were disposed on a portion of the first principal surface, a portion of the second principal surface, a portion of the first side surface, and a portion of the second side surface, when viewed in the height directionin plan view, and the glass layer was provided on the first principal surface-side outer layer and the second principal surface-side outer layer of the multilayer body so as not to be exposed from the effective portion side to the first end surface and the second end surface, so that a crack in the effective portion were not found even if the crack is generated in the multilayer body. In all of examples 1 to 8, the results of the moisture resistance reliability test were 5 or less out of 10 samples.

In the samples of examples 1 to 5, because B/L that is the ratio with respect to the dimension in length direction z connecting the first end surface and the second end surface of the first end surface-side outer layer and the second end surface-side outer layer from the effective portion side of the glass layer was less than or equal to about 50%, as a result of the moisture resistance reliability test, no sample was determined to be defective among the 10 samples, and good results were obtained.

On the other hand, in the samples of the comparative example, because the glass layer was not provided in the first main surface-side outer layer and the second main surface-side outer layer of the multilayer body, 6 cracks were generated in 10 samples, the cracks in the effective portions could not be prevented, and as a result of the moisture resistance reliability test, 6 defects were generated in 10 samples.

From the above results, the glass layer is disposed so as to overlap a portion of the second principal surface, a portion of the first side surface, and a portion of the second side surface, and the tip of the first external electrode and the tip of the second external electrode that are disposed on a portion of the first principal surface when viewed in the height direction, and disposed so as not to be exposed from the effective portion side on the first end surface and the second end surface, so that it is apparent that the extension of the crack to the effective portion can be prevented.

In addition, when the glass layer is disposed in the multilayer body so as to be less than or equal to about 50% of the dimension in length direction z connecting the first end surface and the second end surface of the first end surface-side outer layer and the second end surface-side outer layer from the effective portion side, the crack to the effective portion can be prevented, and it is apparent that the multilayer ceramic capacitor having the moisture resistance reliability can be obtained. That is, in the samples of examples 1 to 5, the glass layer is not disposed so as to extend beyond about 50% of the dimension in length direction z connecting the first end surface and the second end surface of the first end surface-side outer layer and the second end surface-side outer layer from the effective portion side, and the glass layer is disposed so as not to be exposed on the first end surface and the second end surface of the multilayer body. Thus, even if the crack is generated in the multilayer body and the moisture intrudes from the portion where the crack is generated, not only the crack but also the moisture can be retained in the glass layer. Accordingly, it is possible to reduce or prevent the moisture from reaching the interface between the multilayer body and the external electrode, which is likely to be a path for moisture to enter the inside of the effective portion.

4. Experimental Example 2

Subsequently, the multilayer ceramic capacitor in which the thickness in height direction x connecting the first principal surface and the second principal surface of the glass layer was changed in the design of Example 3 in Table 1 was prepared according to the manufacturing method described above, and the evaluation was performed by checking the presence or absence of the crack in the multilayer body and the moisture resistance reliability test. The evaluation based on the presence or absence of the crack in the multilayer body was performed by checking the presence or absence of the crack in the internal direction of the multilayer body and checking the presence or absence of the crack in the effective portion.

(a) Samples Used in Experiment

In the design of Example 3 in Table 1, the samples of sample numbers 1 to 7 were prepared as illustrated in Table 2 for the multilayer ceramic capacitors that are the samples in which the thickness in height direction x connecting the first principal surface and the second principal surface of the glass layer was changed.

(b) Measurement and Test Method

Method for Measuring Thickness of Glass Layer

The thickness of the glass layer was measured by the method described above.

That is, first, in the multilayer ceramic capacitors that is of the samples of the sample numbers 1 to 7, the sectional polishing was performed such that the LT surface of the multilayer ceramic capacitor was exposed to the position corresponding to about ½w of dimension w in width direction y of the multilayer body along the plane direction parallel to the side surface of the multilayer body. Subsequently, an SEM image was taken using a scanning electron microscope at the central portion of the glass layer on the first principal surface-side outer layer side in the sectional polishing. The photographing range at this point was, for example, about 20 μm×about 15 μm, and the magnification was about 6000 times. The dimension in length direction z of the glass layer was divided at five points at equal or substantially equal intervals within this range, and the thickness of the glass layer at the five points was measured. Furthermore, similarly, the SEM image is photographed using the scanning electron microscope at the central portion of the glass layer on the second principal surface-side outer layer side in the polished section. The photographing range at this point was, for example, about 20 μm×about 15 μm, and the magnification was about 6000 times. The dimension in length direction z of the glass layer was divided at five points at equal or substantially equal intervals within this range, and the thickness of the glass layer at the five points was measured. At this point, the average value of the total of 10 points of the 5 points of the glass layer on the first principal surface-side outer layer side and the 5 points of the glass layer on the second principal surface-side outer layer side is calculated, and the value is taken as the thickness of the glass layer of the first principal surface-side outer layer and the second principal surface-side outer layer.

The method for checking the presence or absence of the crack in the multilayer body and the method for checking the presence or absence of the crack in the effective portion were performed in the same manner as in Experimental Example 1.

(c) Results

Table 2 illustrates the thickness of the glass layer, the presence or absence of the crack in the multilayer body, the presence or absence of the crack in the effective portion, and the test result of the moisture resistance reliability test for each of the samples of sample numbers 1 to 7 in which the thickness in the height direction connecting the first principal surface and the second principal surface of the glass layer was changed in the design of Example 3 of Experimental Example 1.

TABLE 2

|  |  | Sample Number 1 | Sample Number 2 | Sample Number 3 | Sample Number 4 | Sample Number 5 | Sample Number 6 | Sample Number 7 |
| --- | --- | --- | --- | --- | --- | --- | --- | --- |
| Thickness of glass layer | (μm) | 0.1 | 0.2 | 2.0 | 5.0 | 10.0 | 13.0 | 15.0 |
| Presence or absence of crack to multilayer body | (piece) | 6/10 | 5/10 | 4/10 | 5/10 | 6/10 | 5/10 | 5/10 |

TABLE 2-continued

|  |  | Sample Number 1 | Sample Number 2 | Sample Number 3 | Sample Number 4 | Sample Number 5 | Sample Number 6 | Sample Number 7 |
|---|---|---|---|---|---|---|---|---|
| Presence or absence of crack to effective portion | (piece) | 1/10 | 0/10 | 0/10 | 0/10 | 0/10 | 0/10 | 0/10 |
| Moisture resistance reliability test | (piece) | 1/10 | 0/10 | 0/10 | 0/10 | 0/10 | 0/10 | 1/10 |

According to Table 2, in the samples of the sample numbers 2 to 6, because the thickness of the glass layer was, for example, greater than or equal to about 0.2 μm and less than or equal about to 13 μm, the crack to the effective portion was not found even if the crack is generated in the multilayer body, no sample was determined to be defective among the 10 samples as the result of the moisture resistance reliability test, and good results were obtained.

On the other hand, in the sample of the sample number 1, because the thickness of the glass layer was, for example, about 0.1 μm, the effect of absorbing the stress (cracks) was degraded, and one crack to the effective portion was generated among 10 samples, and as the result of moisture resistance reliability, one sample was determined to be defective among 10 samples. Accordingly, in the sample of the sample number 1, it was found that the crack sometimes reached the internal electrode layer that is of the effective portion. In addition, in the sample number 7, the crack to the effective portion is not found because the thickness of glass layer was, for example, about 15 μm, but as a result of the moisture resistance reliability test, it was determined that one sample was defective among 10 samples, and it was found that the adhesion force between the dielectric layers was reduced to be likely to generate a structural defect.

From the above results, when the thickness in height direction x connecting the first principal surface and the second principal surface of the glass layer is in the range, for example, greater than or equal to about 0.2 μm and less than or equal to about 13 μm, the crack is induced in the glass layer, and it is apparent that the extension of the crack to the internal electrode layer can be effectively prevented. As a result, the short-circuit failure can be prevented so as to maintain the moisture resistance reliability of the multilayer ceramic capacitor.

5. Experimental Example 3

Subsequently, the multilayer ceramic capacitor in which the Vickers hardness of the glass layer and the Vickers hardness of the dielectric layer were changed in the sample of the sample number 3 with the design of Example 3 in Table 1 and the glass layer having the thickness of, for example, about 2 μm was prepared according to the manufacturing method described above, and the evaluation was performed by checking the presence or absence of the crack in the multilayer body. The evaluation based on the presence or absence of the crack in the multilayer body was performed by checking the presence or absence of the crack in the internal direction of the multilayer body and checking the presence or absence of the crack in the effective portion.

(a) Samples Used in Experiment

In the multilayer ceramic capacitor that is of the sample in which the Vickers hardness of the glass layer and the Vickers hardness of the dielectric layer were changed in the sample of sample number 3 with the design of Example 3 in Table 1 and the glass layer having the thickness of 2 μm, the samples of sample numbers 8 to 12 were prepared as illustrated in Table 3.

The type of glass of the sample of the sample number 8 was $Na_2O$-$SiO_2$-based glass and was $43Na_2O$-$57SiO_2$ glass.

The type of glass of the sample of the sample number 9 was $Na_2O$-$SiO_2$-based glass and was $40Na_2O$-$60SiO_2$ glass.

The type of glass of the sample of the sample number 10 was $Na_2O$-$SiO_2$-based glass and was $40Na_2O$-$60SiO_2$ glass.

The type of glass of the sample of the sample number 11 was $Na_2O$-$SiO_2$-based glass and was $37Na_2O$-$63SiO_2$ glass.

The type of glass of the sample of the sample number 12 was $Na_2O$-$SiO_2$-based glass and was $34Na_2O$-$66SiO_2$ glass.

(b) Measurement and Test Method

Method for Measuring Vickers Hardness of Glass Layer

Vickers hardness of the glass layer was measured by the method described below.

That is, for the Vickers hardness of the glass layer, first, in the multilayer ceramic capacitor, the sectional polishing was performed such that the LT surface of the multilayer ceramic capacitor was exposed to the position having the dimension of about ½w of dimension w in width direction y of the multilayer body along the plane direction parallel to the side surface of the multilayer body. Subsequently, at the central portion of the glass layer on the first principal surface-side outer layer side in the polished section, the Vickers indenter was pressed against the glass layer to measure the Vickers hardness of the glass layer on the first principal surface-side outer layer side using the microhardness tester. Subsequently, at the central portion of the glass layer on the second principal surface-side outer layer side in the polished cross section, the Vickers indenter was pressed against the glass layer to measure the Vickers hardness of the glass layer on the second principal surface-side outer layer side using a microhardness tester. At this point, an average value of the Vickers hardness of the glass layer on the first principal surface-side outer layer side and the Vickers hardness of the glass layer on the second principal surface-side outer layer side is calculated, and the value is taken as the Vickers hardness of the glass layer of the multilayer ceramic capacitor.

Method for Measuring Vickers Hardness of Dielectric Layer

The Vickers hardness of the dielectric layer was measured by the method described below.

That is, for the Vickers hardness of the dielectric layer, first, in the multilayer ceramic capacitor, the sectional polishing is performed such that the LT surface of the multilayer ceramic capacitor is exposed to the position of about ½w dimension of dimension w in width direction y of the multilayer body along the plane direction parallel to the side surface of the multilayer body. Subsequently, at the central portion on the first principal surface-side outer layer side in the polished section, the Vickers indenter is pressed against the dielectric layer to measure the Vickers hardness of the dielectric layer on the first principal surface-side outer layer side using the microhardness meter. Subsequently, at the central portion on the second principal surface-side outer layer side in the polished section, the Vickers indenter is pressed against the dielectric layer to measure the Vickers hardness of the dielectric layer on the second principal surface-side outer layer side using the microhardness meter. At this point, an average value of the Vickers hardness of the dielectric layer on the first principal surface-side outer layer side and the Vickers hardness of the dielectric layer on the second principal surface-side outer layer side is calculated, and the value is taken as the Vickers hardness of the dielectric layer of the multilayer ceramic capacitor.

The method for checking the presence or absence of the crack in the multilayer body and the method for checking the presence or absence of the crack in the effective portion were performed in the same or substantially the same manner as in Experimental Example 1.

(c) Results

Table 3 illustrates the test results of the thickness of the glass layer, the presence or absence of the crack in the multilayer body, and the presence or absence of the crack in the effective portion for each of the samples of sample numbers 8 to 12 in which the Vickers hardness of the glass layer and the Vickers hardness of the dielectric layer were changed in the samples of sample number 3 with the design of Example 3 in Table 1 and the glass layer having the thickness of 2 μm.

TABLE 3

|  | Sample Number 8 | Sample Number 9 | Sample Number 10 | Sample Number 11 | Sample Number 12 |
| --- | --- | --- | --- | --- | --- |
| Vickers hardness (A) of glass layer (GPa) | 7.3 | 7.7 | 8.0 | 8.3 | 8.7 |
| Vickers hardness (B) of dielectric layer (GPa) | 8.1 | 8.0 | 8.0 | 8.1 | 8.0 |
| Relationship between vickers hardness (A) of glass layer and vickers hardness (B) of dielectric layer | A < B | A < B | A = B | A > B | A > B |
| Presence or absence of crack to (piece multilayer body) | 7/10 | 8/10 | 6/10 | 8/10 | 7/10 |
| Presence or absence of crack to (piece effective portion) | 0/10 | 0/10 | 1/10 | 3/10 | 4/10 |

According to Table 3, in sample numbers 8, 9, the Vickers hardness of the glass layer was lower than the Vickers hardness of the dielectric layer, so that the crack in the effective portion were not found even if the crack in the multilayer body is generated.

In addition, in sample numbers 8 and 9, it was found that the crack in the effective portion could be prevented because the Vickers hardness of the glass layer was, for example, lower than about 8 GPa that is the Vickers hardness of the dielectric layer.

On the other hand, in the samples of sample numbers 10 to 12, because the Vickers hardness of the glass layer was greater than or equal to the Vickers hardness of the dielectric layer, it was found that the crack was generated in the effective portion although the number of samples was less than or equal to 4 in 10 in all samples.

In the samples of sample numbers 10 to 12, it was found that the crack is generated in effective portion because the Vickers hardness of the glass layer was greater than or equal to about 8 GPa that is the Vickers hardness of the dielectric layer.

From the above results, it became clear that the extension of the crack to the internal electrode layer that becomes the effective portion was effectively prevented when the Vickers hardness of the glass layer was lower than the Vickers hardness of the dielectric layer. As a result, the short-circuit failure can be prevented so as to maintain the moisture resistance reliability of the multilayer ceramic capacitor.

As described above, preferred embodiments of the present invention are disclosed, but the present invention is not limited thereto.

That is, various changes can be made in the configuration, shape, material, quantity, position, disposition, and the like with respect to the preferred embodiments described above without departing from the scope of the technical idea and object of the present invention, and these changes are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a multilayer body including a plurality of laminated dielectric layers, a plurality of internal electrode layers laminated on respective ones of the plurality of dielectric layers, a first principal surface and a second principal surface facing each other in a height direction, a first side surface and a second side surface facing each other in a width direction orthogonal or substantially orthogonal to the height direction, and a first end surface and a second end surface facing each other in a length direction orthogonal or substantially orthogonal to the height direction and the width direction;
a first internal electrode layer on the plurality of dielectric layers and exposed on the first end surface;
a second internal electrode layer on the plurality of dielectric layers and exposed on the second end surface;
a first external electrode connected to the first internal electrode layer and disposed on the first end surface and a portion of the first principal surface, a portion of the second principal surface, a portion of the first side surface, and a portion of the second side surface; and
a second external electrode connected to the second internal electrode layer and disposed on the second end surface and a portion of the first principal surface, a portion of the second principal surface, a portion of the first side surface, and a portion of the second side surface; wherein
the multilayer body includes:
an effective portion at which the plurality of internal electrode layers face each other;
a first principal surface-side outer layer on a first principal surface side and including the plurality of dielectric layers between the first principal surface and an outermost surface of the effective portion on the first principal surface side and an extension line of the outermost surface;
a second principal surface-side outer layer on a second principal surface side and including the plurality of dielectric layers between the second principal surface and an outermost surface of the effective portion on the second principal surface side and an extension line of the outermost surface;
a first end surface-side outer layer on a first end surface side and including the plurality of dielectric layers between the first end surface and an outermost surface of the effective portion on the first end surface side; and a second end surface-side outer layer on a second end surface side and including the plurality of dielectric layers between the second end surface and an outermost surface of the effective portion on the second end surface side;

the first principal surface-side outer layer and the second principal surface-side outer layer include a glass layer on a dielectric layer and face the effective portion;

the glass layer overlaps a tip of the first external electrode and a tip of the second external electrode disposed on a portion of the first principal surface, a portion of the second principal surface, a portion of the first side surface, and a portion of the second side surface when viewed in the height direction; and the glass layer is not exposed at the first end surface and the second end surface from an effective portion side.

2. The multilayer ceramic capacitor according to claim 1, wherein the glass layer is disposed in the multilayer body so as to be less than or equal to about 50% of a dimension in a length direction connecting the first end surface and the second end surface of the first end surface-side outer layer and the second end surface-side outer layer from the effective portion side.

3. The multilayer ceramic capacitor according to claim 1, wherein a thickness of the glass layer in the height direction connecting the first principal surface and the second principal surface is greater than or equal to about 0.2 μm and less than or equal to about 13 μm.

4. The multilayer ceramic capacitor according to claim 1, wherein Vickers hardness of the glass layer is lower than Vickers hardness of the dielectric layer.

5. The multilayer ceramic capacitor according to claim 4, wherein the Vickers hardness of the glass layer is less than or equal to about 8 GPa.

6. The multilayer ceramic capacitor according to claim 1, wherein the multilayer body has a dimension in the length greater than or equal to about 0.2 mm and less than or equal to about 10 mm, a dimension in the width direction greater than or equal to about 0.1 mm and less than or equal to about 10 mm, and a dimension in the height direction greater than or equal to about 0.1 mm and less than or equal to about 5 mm.

7. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

8. The multilayer ceramic capacitor according to claim 7, wherein each of the plurality of dielectric layers includes at least one of an Mn compound, an Fe compound, a Cr compound, a Co compound, or an Ni compound as an accessory component.

9. The multilayer ceramic capacitor according to claim 1, wherein a thickness of each of the plurality of dielectric layers is greater than or equal to about 0.5 μm and less than or equal to about 10 μm.

10. The multilayer ceramic capacitor according to claim 1, wherein the glass layer includes at least one of borosilicate glass, alkali silicate glass, or alkaline earth silicate glass.

11. The multilayer ceramic capacitor according to claim 1, wherein each of the plurality of internal electrode layers includes at least one of Ni, Cu, Ag, Pd, or Au or an alloy including at least one of Ni, Cu, Ag, Pd, or Au.

12. The multilayer ceramic capacitor according to claim 1, wherein a thickness of each of the plurality of internal electrode layers is greater than or equal to about 0.2 μm and less than or equal to about 2.0 μm.

13. The multilayer ceramic capacitor according to claim 1, wherein a number of the plurality of internal electrode layers is greater than or equal to 15 and less than or equal to 200.

14. The multilayer ceramic capacitor according to claim 1, wherein each of the first and second external electrodes includes a ground electrode layer including a metal component and a glass component, and a plating layer.

15. The multilayer ceramic capacitor according to claim 14, wherein the ground electrode layer includes a baked layer or a thin film layer.

16. The multilayer ceramic capacitor according to claim 14, wherein the glass component includes at least one of B, Si, Ba, Mg, Al, or Li.

17. The multilayer ceramic capacitor according to claim 14, wherein the metal component includes at least one of Cu, Ni, Ag, Pd, an Ag-Pd alloy, or Au.

18. The multilayer ceramic capacitor according to claim 1, wherein a thickness of each of the first and second external electrodes is greater than or equal to about 3 μm and less than or equal to about 160 μm.

* * * * *